Patented June 23, 1953

2,643,242

UNITED STATES PATENT OFFICE 2,643,242

POLYMERIZED DICHLOROSTYRENES CONTAINING ORGANO-TIN ANTICRAZING AGENTS

John W. Churchill, Kenmore, N. Y., assignor to Mathieson Chemical Corporation, New York, N. Y., a corporation of Virginia No Drawing. Application August 18, 1948, Serial No. 45,000

6 Claims. (Cl. 260—45.75)

This invention relates to a method of preventing deterioration by "crazing" of formed plastics. More particularly, the invention provides a method of suppressing this unusual phenomena in certain polymerized vinyl aromatic compounds by the incorporation of certain organic tin compounds therein, and an improved plastic composition formed therefrom.

The phenomenon of crazing in polymerized vinyl aromatic compounds renders the materials objectionable from a sales viewpoint although the physical properties of crazed samples do not appear to be adversely affected. Crazing is an internal formation of discontinuity in the plastic but the cause and nature of the phenomenon is not wholly understood. Two general types of crazing have previously been distinguished and designated as "wet" and "dry" crazing. The former seems to be due to the segregation of monomer residues or low molecular weight polymers and appears as surface roughnesses eventually accompanied by the development of cloudiness. This phenomenon is also known sometimes as "monomer disease." The "dry" crazing appears as internal cracks of various dimensions.

There is still another form of crazing of a previously unknown character which appears to be peculiar to nuclear chlorinated styrenes and copolymers containing 30% or more of nuclear chlorinated styrenes. It first becomes apparent by the formation of visible spicules in the polymeric article which may grow in number and extent with time. This type of crazing or spiculation is more extensive if the article is in a moist atmosphere than in a dry atmosphere. To a slight extent the crazing can be minimized by annealing the molded articles at an elevated temperature, for example, 105° C., for several hours immediately after molding. However, it is not susceptible to satisfactory treatment by annealing as are the previously known types of crazing. In some cases, slight improvement in the prevention of crazing can be effected by cooling the article quickly in water rather than allowing it to cool slowly in air, but the extent to which water cooling improves the plastic in this respect is rather minor.

This latter form of crazing or spiculation is further distinguished from the other forms in that it usually increases to a maximum and subsequently decreases somewhat on standing. However, without the treatment of the present invention, the decrease in amount of crazing is minor in extent and the product is still unsalable even after long standing. It is important to note that this form of crazing has little effect, even when apparently extensive, on the particularly desirable physical and electrical properties of the nuclear chlorinated styrenes. The necessity of overcoming this form of crazing is principally due to the undesirable appearance of the plastic material.

I have found that the incorporation of small amounts of certain organo-tin compounds in polymerized dichlorostyrenes and their copolymers effectively prevents crazing. By "organo-tin compounds" in this application, I mean the true organo-tin compounds having at least one carbon-tin bond preferably the tetra substituted (tetravalent) tin compounds. The substituting radicals may be aliphatic or aromatic or mixed in nature, but the aromatic compounds appear to be more satisfactory than aliphatic. Examples of compounds useful according to my invention are tetraphenyl tin, diphenyl diethyl tin, dibutyl diphenyl tin, tetraoctyl tin, dibutyl tin maleate, dibutyl tin phthalate, tetrabutyl tin, dibutyl tin oxide, dibutyl tin dilaurate, and dibutyl tin malonate.

Organo tin compounds which exemplify some of those which are effective in the present invention may be represented by the following formulas:

and

wherein $R_1$ and $R_2$ are selected from the group consisting of phenyl and alkyl radicals, $R_3$ and $R_4$ are selected from the group consisting of phenyl, alkyl, and lauroyloxy radicals, and $R_5$ is selected from the group consisting of oxygen,

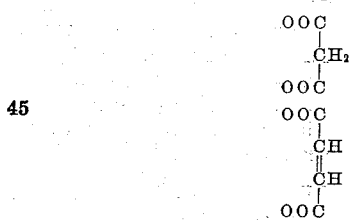

and

radicals.

My invention is particularly efficacious with respect to polymerized dichlorostyrenes but it is also effective with other vinyl aromatics such as styrene itself and with copolymers of dichlorostyrene, for example, with styrene or other copolymers. Amounts of tetraphenyl tin or other anti-crazing organic tin compounds up to about 5% may be used, but usually one per cent or less is effective, and I particularly prefer to use from 0.05% to 0.5% based on the weight of the polymer.

The anti-crazing tin compound may be introduced into the polymer in any suitable manner, for example, by milling, or it may be dissolved in the monomer before polymerization.

In order to test my compositions, the monomers or mixtures thereof were polymerized by known methods with or without my anti-crazing agents dissolved therein. Into some of the polymerized compositions, my anti-crazing agents were incorporated by milling. The test pieces were stored in a desiccator over water for extended periods of observation. The number of days to begin crazing was recorded for each sample when the first spicule became visible. The second feature observed was the number of days for the sample to become fully crazed. This point was judged to have been reached when it appeared that no additional spicules could form without contacting spicules already present. After further storage spicules began to disappear in some samples and this feature was noted as the time to begin regression. The tests were finally concluded by reporting the total number of days since molding and the beginning of tests together with the per cent of area crazed in that time.

*Example I*

A sample of polymerized dichlorostyrene prepared from the mixed isomeric monomers containing 0.35% of lauroyl peroxide was placed in a desiccator over water for observation. At the same time samples were placed in the desiccator which had been prepared from the same polymerized dichlorostyrene by milling thereinto 0.5%, 1% and 2% of tetraphenyl tin. The untreated sample began to craze in one day and was completely crazed in one additional day. No regression apparently occurred in this sample, and after 135 days storage it was still completely crazed and very cloudy. In all of the samples containing tetraphenyl tin crazing began after 5 days and was complete only after the lapse of 38 days. Regression began after 120 days, and after 135 days the samples were about 90% crazed but still clear.

Samples of the polymerized blank and of the compositions containing tetraphenyl tin were also tested by allowing them to stand in air at room temperature. Both the samples of the blank which were air cooled and water cooled were badly crazed, whereas the sample annealed at 105° C. for 16 hours was about 75% crazed after four months. None of the samples containing tetraphenyl tin, when treated under these conditions, showed any crazing.

*Example II*

A commercially extruded sample of polymerized dichlorostyrene containing no tetraphenyl tin was compared under the same conditions as described in Example I with extruded polymer into which 0.25% and 0.5% of tetraphenyl tin had been milled. The untreated sample began to craze after two days and crazing was complete after 8 days. No regression was noted and after 132 days the sample was cloudy and 100% crazed. On the other hand, the two samples containing tetraphenyl tin began to craze only after four days and required a total of 22 days to complete crazing. After 95 days, regression began and after 110 days was reduced to 75% in the samples containing 0.25% of tetraphenyl tin, and to 50% in the samples containing 0.5% tetraphenyl tin.

When stored in air at room temperature, the untreated sample showed about 10% crazing in the air cooled and water cooled samples but the sample annealed as described in the preceding example showed only about 5% crazing. Substantially no crazing occurred in the samples containing tetraphenyl tin stored under these conditions.

*Example III*

Samples of monomeric dichlorostyrene were admixed with 0.1%, 0.25% and 0.5% of tetraphenyl tin. These solutions and a blank containing no tetraphenyl tin were polymerized under identical conditions. The polymer was ground and injection molded and the test pieces placed in a desiccator over water for observation. The untreated sample was completely crazed in one day and remained so during the entire test of 126 days. The sample containing 0.1% of tetraphenyl tin began to craze in 2 days and was completely crazed in 10 days. Regression began after 120 days and in 126 days was 75% crazed but clear. The sample containing 0.25% of tetraphenyl tin required 3 days before evidence of crazing was observed, and 15 days before being completely crazed. After 65 days, regression began and the sample was only 50% crazed at the end of 123 days. The third sample containing 0.5% of tetraphenyl tin showed crazing after 7 days and complete crazing after 15 days with regression beginning after 73 days, being 50% complete after 123 days.

When air cooled, water cooled or annealed, as described in Example I, the untreated sample was 100% crazed, whereas the sample containing 0.1% of tetraphenyl tin showed 10% crazing in the air cooled and water cooled samples but none in the annealed sample. The samples containing larger percentages of tetraphenyl tin showed no crazing under any of these conditions.

*Example IV*

Tetraphenyl tin to the extent of 0.25% was dissolved in part of another sample of mixed isomers of monomer dichlorostyrene and both this solution and the untreated dichlorostyrene were polymerized under identical conditions. The polymer was ground and injection molded and the test pieces placed in a desiccator over water. The untreated sample was completely crazed in 3 days, whereas the sample containing 0.25% of tetraphenyl tin required 39 days before becoming completely crazed. No regression occurred in the untreated sample and after 120 days it was cloudy and 100% crazed. The sample containing tetraphenyl tin showed regression after 74 days and was only 50% crazed after 120 days. It remained clear throughout the test.

The untreated sample showed 100% crazing whether air cooled or water cooled and 50% crazing when annealed while the sample containing tetraphenyl tin showed no crazing under any of these conditions.

*Example V*

0.5% of tetraphenyl tin was dissolved in monomeric dichlorostyrene and the solution was polymerized. The polymer was ground and molded by a commercial molder. Samples of untreated polymerized dichlorostyrene molded by the same molder showed complete crazing in 1 day, whereas the polymer containing tetraphenyl tin required 5 days to begin crazing. Regression began after 20 days and after 73 days had substantially disappeared after reaching a maximum of about 25%.

None of these samples containing tetraphenyl tin, whether air cooled or water cooled or annealed at 105° C. for 16 hours, showed any trace of crazing after standing for several months in the air at room temperature.

Example VI

A sample of mixed nuclear dichlorostyrenes containing 0.5% of dibutyl tin oxide dissolved therein was polymerized by conventional means, ground and injection molded. In storage over water in a desiccator, crazing was 100% in 7 days but regression began in 50 days and was reduced to 50% in 68 days. The sample remained clear throughout the period of test.

Example VII

Samples of untreated monomeric dichlorostyrene, a portion of the same monomer containing dissolved therein 0.5% of tetraphenyl tin, a third portion of the same monomer containing 0.5% of dibutyl diphenyl tin and a fourth sample containing 0.5% of dibutyl tin dilaurate were polymerized under identical conditions using 0.25% of lauroyl peroxide. The polymers were ground and injection molded. The test pieces were stored in a desiccator over water. The untreated sample became completely crazed in 3 days and remained cloudy and crazed for the 72 days it was under observation. The sample containing tetraphenyl tin became completely crazed only after 18 days, and after 27 days regression began. After 76 days substantially all of the crazing had disappeared and the sample was clear. The sample containing 0.5% of dibutyl diphenyl tin was completely crazed after 4 additional days. After 24 days regression began and amounted to only about 10% after 76 days. The sample containing 0.5% of dibutyl tin dilaurate was completely crazed in 9 days but regression began after 14 days and was reduced to about 25% in 73 days.

None of these samples showed any crazing when annealed at 105° C. for 16 hours and allowed to stand in the air at room temperature. The air cooled and water cooled samples showed some crazing but this disappeared in a few days.

Example VIII

Tetraphenyl tin was dissolved in a portion of another sample of monomeric dichlorostyrene, and both the treated and untreated portions were polymerized using 0.1% of benzoyl peroxide. The polymerized, ground and injection molded samples were stored as in previous examples. While the untreated sample became completely crazed in 3 days, the treated sample required 13 days. No regression occurred in the untreated sample, whereas regression began in the treated sample after 35 days, and after 76 days was reduced to about 10%.

Samples of the polymer containing tetraphenyl tin when (a) air cooled (b) water cooled, and (c) annealed at 105° C. for 16 hours showed no crazing at any time during several months standing in air at room temperature.

Example IX

A mixture of 50% by weight of styrene and 50% of dichlorostyrene was divided in half and 0.25% of tetraphenyl tin was dissolved in one portion. Both samples were polymerized, ground and injection molded to obtain test pieces stored as described in preceding examples. The treated sample showed no crazing and remained clear after 46 days. The untreated sample was completely crazed after 1 day and after 30 days was still in that condition.

Example X

Dibutyl tin malonate showed only limited solubility in mixed monomeric dichlorostyrenes. However, sufficiently dissolved to render the composition craze-free for 10 days in air at room temperature saturated with moisture.

Example XI

A sample of mixed isomeric nuclear dichlorostyrenes was saturated with dibutyl tin phthalate, 0.1% of benzoyl peroxide was added, and the composition polymerized. The polymer was maintained in an atmosphere saturated with moisture at room temperature for a period of 83 days before the test was discontinued. At that time no crazing had developed.

Example XII

A sample of mixed nuclear dichlorostyrenes saturated with dibutyl tin maleate was polymerized using 0.1% of benzoyl peroxide. The polymer remained craze-free for 88 days when maintained at room temperature in air saturated with moisture. The test was then discontinued.

An untreated sample of monomer was polymerized under the same conditions and tested under the same conditions as in the three preceding examples. The blank was badly crazed in three days.

Example XIII 0.5% of tetrabutyl tin was dissolved in monomeric nuclear dichlorostyrene, polymerized, ground, and molded. After 38 days in an atmosphere saturated with moisture at room temperature, the sample was about 75% crazed.

Examples I to IX and XIII were molded polymers, while Examples X to XII were cast polymers.

I claim:

1. Polymerized dichlorostyrenes having incorporated therein a small quantity of an anti-crazing agent which consists of an organo tin compound having the structural formula selected from the group consisting of:

and

wherein $R_1$ and $R_2$ are selected from the group consisting of phenyl and alkyl radicals, $R_3$ and $R_4$ are selected from the group consisting of phenyl, alkyl, and lauroyloxy radicals, and R₅ is selected from the group consisting of oxygen,

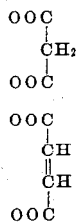

and

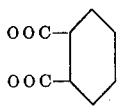

radicals.

2. Polymerized dichlorostyrenes having incorporated therein a small quantity of an anti-crazing agent which consists of tetraphenyl tin.

3. A polymerized dichlorostyrene according to claim 2 in which the tin compound is present in an amount varying from 0.05% to 5% by weight, based upon the weight of the polymer.

4. Polymerized dichlorostyrenes having incorporated therein a small quantity of an anti-crazing agent which consists of dibutyl tin maleate.

5. Polymerized dichlorostyrenes having incorporated therein a small quantity of an anti-crazing agent which consists of dibutyl tin phthalate.

6. Polymerized dichlorostyrenes having incorporated therein a small quantity of an anti-crazing agent which consists of tetrabutyl tin.

JOHN W. CHURCHILL.

References Cited in the file of this patent

UNITED STATES PATENTS

| Number | Name | Date |
|---|---|---|
| 2,267,777 | Yngve | Dec. 30, 1941 |
| 2,267,779 | Yngve | Dec. 30, 1941 |
| 2,307,092 | Yngve | Jan. 5, 1943 |
| 2,476,422 | Leininger | July 19, 1949 |
| 2,477,349 | Richard | July 26, 1949 |

FOREIGN PATENTS

| Number | Country | Date |
|---|---|---|
| 497,879 | Great Britain | Dec. 30, 1938 |